United States Patent [19]

Tongu

[11] Patent Number: 4,691,528
[45] Date of Patent: Sep. 8, 1987

[54] AIR-COOLED ABSORPTION TYPE WATER COOLING/HEATING APPARATUS

[75] Inventor: Shinji Tongu, Hamamatsu, Japan

[73] Assignee: Yazaki Corporation, Japan

[21] Appl. No.: 909,718

[22] Filed: Sep. 22, 1986

[30] Foreign Application Priority Data

Aug. 15, 1985 [JP] Japan ............................... 60-179954
Sep. 24, 1985 [JP] Japan ............................... 60-210706

[51] Int. Cl.$^4$ ............................................. F25B 27/00
[52] U.S. Cl. ................................... 62/238.3; 62/324.2; 62/476; 62/495
[58] Field of Search ..................... 62/238.3, 324.2, 476, 62/484, 495, 496

[56] References Cited

U.S. PATENT DOCUMENTS

| | | | | |
|---|---|---|---|---|
| 3,407,625 | 10/1968 | McDonald | ............................ | 62/476 |
| 3,605,432 | 9/1971 | Wada | ............................ | 62/476 X |
| 3,638,452 | 2/1972 | Kruggel | ............................ | 62/495 X |
| 4,573,330 | 3/1986 | von der Sluys et al. | ......... | 62/495 X |

Primary Examiner—Lloyd L. King
Attorney, Agent, or Firm—Parkhurst & Oliff

[57] ABSTRACT

An air-cooled absorption type water cooling/heating apparatus has a cooling circulation system including an evaporator in which a liquid refrigerant is evaporated so as to cool a heat exchanger leading to a cooling heat radiator, and a heating circulation system including a heat exchanger leading to a heating heat radiator and disposed in a separator in which the solution which has been thinned as a result of absorption of the refrigerant is heated and fractionated into refrigerant vapor and thick solution. In the heating mode of operation, the circulation passages for the solution and refrigerant are closed. This arrangement enables a heat source, which is used for heating the refrigerant and the absorption solution in the cooling mode of operation, to be used also in the heating mode of operation, so that the construction of the apparatus as a whole is made compact.

16 Claims, 6 Drawing Figures

PRIOR ART

Fig. 6

PRIOR ART

4,691,528

AIR-COOLED ABSORPTION TYPE WATER COOLING/HEATING APPARATUS

BACKGROUND OF THE INVENTION

The present invention relates to an air-cooled absorption type water cooling/heating apparatus in which air is used as a cooling medium for cooling both a condenser for liquefying gaseous refrigerant separated in a separator and an absorber which is supplied with a thick salt solution for absorbing gaseous refrigerant evaporated in an evaporator.

A water-cooled absorption type water cooling/heating apparatus has been known in which a condenser and an absorber are cooled by water. This apparatus has a cooling system which employs a heat exchanger for chilling water by making use of heat absorption caused by evaporation of a liquid-phase refrigerant in the evaporator. The apparatus has a cooling/heating change-over valve which permits, when the apparatus is used in heating mode, the evaporator to be supplied with hot refrigerant gas so that the heat exchanger functions as a water heater. In this apparatus, therefore, the heat exchanger is serveable both as a water cooler and a water heater, depending on the operation mode of the apparatus. This means that the provision of independent heat exchangers for cooling and heating purposes is not necessary.

Figure 5:
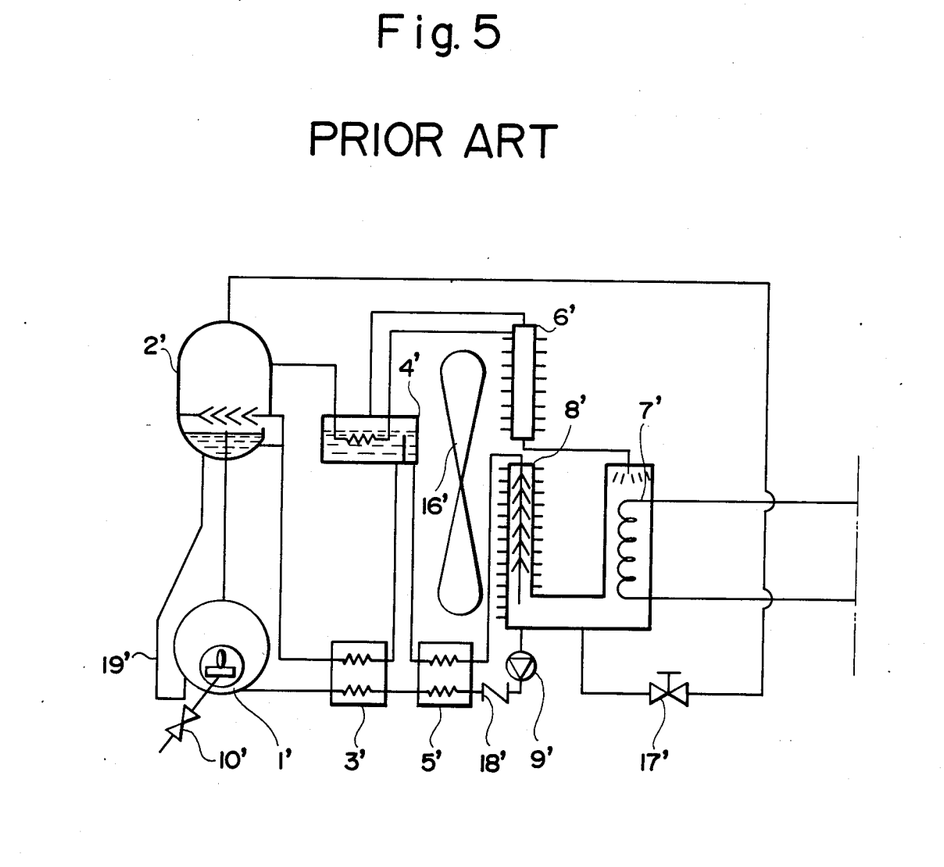
FIG. 5 is a diagrammatic illustration of a conventional air-cooled absorption type water cooling/heating apparatus.

Known also is an air-cooled absorption type water cooling/heating apparatus. This apparatus has a cooling cycle which is constituted by, as shown in FIG. 5, a high-temperature regenerator 1' for heating a thin salt solution which has absorbed a refrigerant, a separator 2' for fractionating the heated solution into refrigerant vapor and a solution of an intermediate thickness, a low-temperature regenerator 4' for heating the solution of intermediate thickness by the heat produced as a result of condensation of the refrigerant gas, an air-cooled condenser 6' for liquefying the refrigerant gas from the low-temperature regenerator 4', an evaporator 7' in which the liquefied refrigerant from the condenser 6' is evaporated so as to chill water, an absorber 8' in which the refrigerant gas from the evaporator 7' is absorbed in thick solution supplied from the low-temperature regenerator 4', and a pump 9' which pumps up the thin solution which has absorbed the refrigerant into the high-temperature regenerator 1'. The apparatus further has a cooling/heatig change-over valve 17' provided in a pipe between the separator 2' and the evaporator 7'. When this valve 17' is opened, the heat exchanger of the evaporator 7', which constitutes a water cooler in the cooling cycle, functions as a water heater. In this case, therefore, the above-mentioned constituents form a heating cycle.

Figure 6:
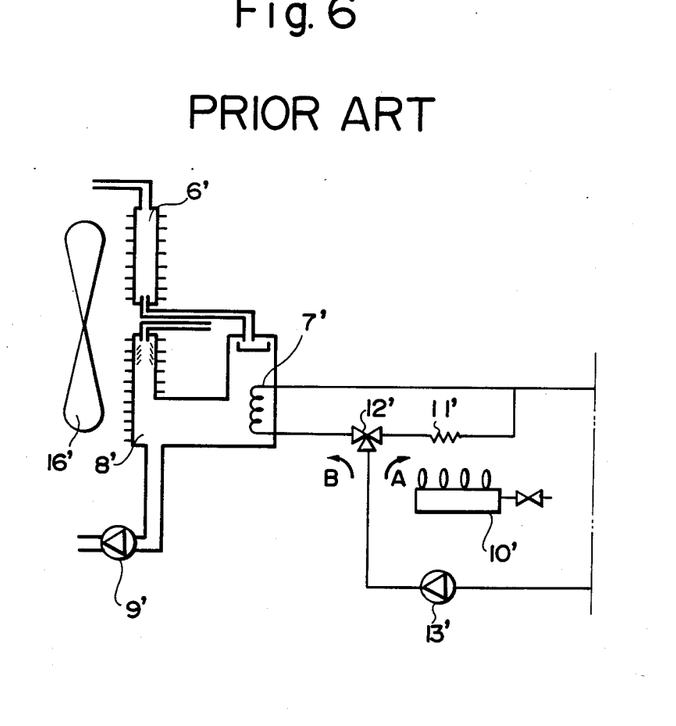
FIG. 6 is a diagrammatic illustration of another conventional air-cooled absorption type water cooling/heating apparatus.

FIG. 6 shows still another known water cooling/heating apparatus which has, in addition to the constituents of the apparatus shown in FIG. 5, a water heater 11' and a heat source 10' for the water heater 11'. A three-way valve 12' is switchable between two positions such as to open either a flow passage A or a flow passage B. In the apparatus shown in FIG. 5, the heat exchanger of the evaporator 7' functions both for cooling and heating purposes. Unfortunately, an effort for attaining high efficiency of cooling of the condenser 6' and the absorber 8' by air results in a reduction of the heating capacity of the apparatus in heating mode, due to an increase in the natural heat radiation from the condenser 6' and the absorber 8' to the ambient air. The apparatus shown in FIG. 6, therefore, incorporates the water heater 11' and the heat source 10' which in combination assist the evaporator in heating the water so as to compensate for the reduction in the heating power experienced with the apparatus shown in FIG. 5. The apparatus shown in FIG. 6, however, necessitates two heat sources: namely, the heat source for heating the high-temperature regenerator in the cooling mode and the heat source 10' for the water heater 11', with the result that the construction of the apparatus as a whole is complicated and the production cost is raised.

SUMMARY OF THE INVENTION

Accordingly, an object of the invention is to provide an air-cooled absorption type water cooling/heating apparatus which is capable of producing sufficient cooling power and heating power with a single heat source and which permits an easy switching between the cooling mode operation and the heating mode operation.

To this end, according to one aspect of the invention, there is provided an air-cooled absorption type water cooling/heating apparatus comprising: a cooling circulation system including, a high-temperature regenerator in which a thin solution which has absorbed a refrigerant is heated so that refrigerant vapor and thick solution are regenerated, a separator for separating the refrigerant vapor and the thick solution from each other, an air-cooled condenser for condensing the refrigerant vapor into liquid phase by air-cooling, an evaporator in which the condensed liquid refrigerant is evaporated by heat derived from a heat exchanger leading to a heat radiator, thereby cooling a heat transfer medium circulated through the heat exchanger, an absorber in which the refrigerant vapor generated in the evaporator in the thick slution introduced from the separator, the absorber being air-cooled so that the heat produced as a result of the absorption is carried away by the cooling air, and a pump for supplying the thin solution which is formed from the thin solution as a result of absorption of the refrigerant vapor into the high-temperature regenerator; a heating circulation system including a heat exchanger provided in the separator and leading to the heat radiator; and means for closing a line between the separator and the condenser and a line between the separator and the absorber during operation in the heating mode.

Briefly, the apparatus in accordance with the present invention offers the following advantages.

(i) The production cost is lowered because the cooling and heating modes of operation are realized by a single heat source.

(ii) The switching between the cooling mode operation and the heating mode operation is carried out simply by switching over of the water circulation line between that for the cooling and that for the heating.

(iii) Since the intermediate-thickness solution flow control valve and the refrigerant flow control valve are simple automatic control valve capable of operating in response to pressures therein, it is not necessary to employ specific control valves such as a solenoid valve mechanism, modutrol valve mechanism, and so forth. This contributes to a reduction in the cost required for the control.

The above and other objects, features and advantages of the invention will become clear from the following description of the preferred embodiment when the same is read in conjunction with the accompanying drawings.

DESCRIPTION OF THE PREFERRED EMBODIMENT

A preferred embodiment of the invention will be described hereinunder with reference to the accompanying drawings.

Figure 1:
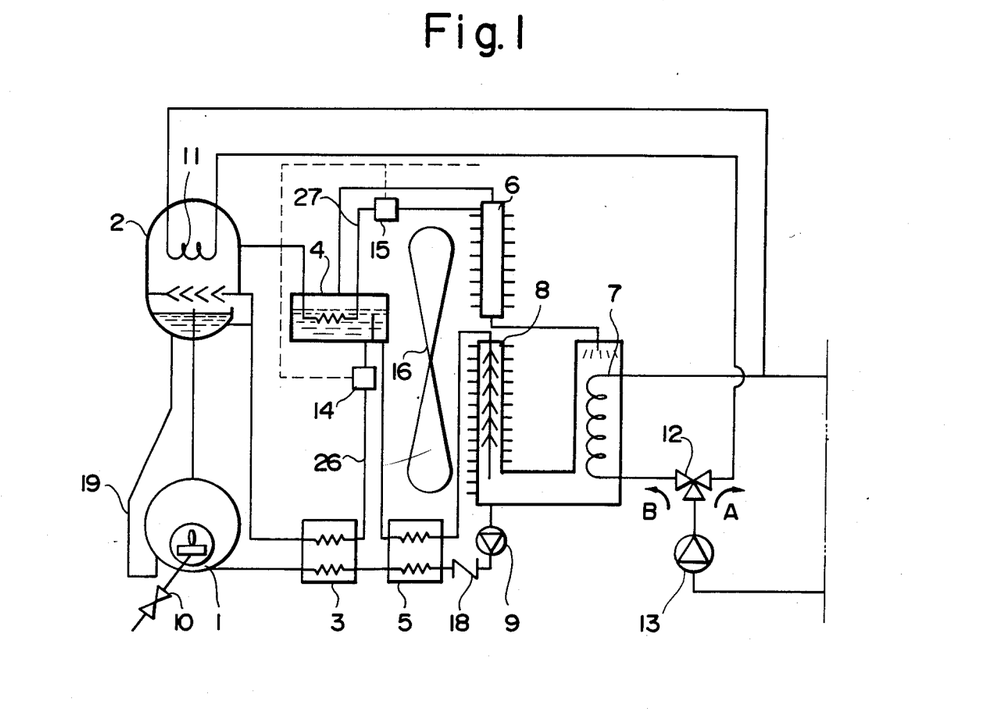
FIG. 1 is a diagrammatic illustration of an air-cooled absorption type water cooling/heating apparatus in accordance with the present invention.

Referring first to FIG. 1, an air-cooled absorption type water cooling/heating apparatus of the invention has the following parts: a high-temperature regenerator 1 in which a thin solution such as LiBr which has absorbed a refrigerant such as water is heated so as to be fractionated into refrigerant vapor and an intermediate-thickness solution; a separator 2 in which the refrigerant vapor and the intermediate thickness solution are separated from each other; a high-temperature heat exchanger 3; a low-temperature regenerator 4 in which the intermediate thickness solution, which has been cooled through heat exchange with low-temperature thin solution in the high-temperature heat exchanger 3, is heated by the refrigerant vapor separated in the separator 2, so that the intermediate thickness solution is fractionated into refrigerant vapor and thick solution; a low-temperature heat exchanger 5; a condenser 6 for liquefying the refrigerant vapor produced in the low-temperature regenerator 4 and for cooling the refrigerant which has been liquefied through the low-temperature regenerator 4; an evaporator 7 in which the refrigerant liquefied in the condenser is made to evapotrate through heat exchange with water as a load thus chilling the water; an absoraer 8 for causing the refrigerant vapor generated in the evaporator 7 to be absorbed in the thick solution which has been generated in the low-temperature regenerator 4 and cooled through heat exchange with the cold thin solution in the low-temperature regenerator 5; and a solution pump 9 which pumps up the thin solution from the absorber 8 to the high-temperature regenerator 1. These constituents in combination provide closed loops for cooling and heating cycles. Namely, chilled water which serves as a cold heat source is generated in the heat exchanger of the evaporator 7 as a result of heat exchange between water and the refrigerant which is being evaporated in the evaporator 7, while warmed water which serves as a high-temperature heat source is generated in a high-temperature regenerator 11 provided in the separator 2, since the water is heated by the heat which is produced as the refrigerant vapor introduced from the high-temperature regenerator is condensed into liquid phase within the separator 2. The thus generated chilled water and warmed water are selectively delivered to a service line leading to a heat radiator (not shown), in accordance with the position of a three-way valve 12 which is disposed in the line between the evaporator 7 and the water heater 11. The circulation of the water as the heat transfer medium is effected by a water circulation pump 13 which is disposed upstream of the three-way valve 12. An intermediate thickness solution flow control valve 14, which is adapted to automatically open and close in response to the pressure differential between the separator 2 and the condenser 6, is provided in the line 26 through which the intermediate thickness solution is supplied to the low-temperature regenerator 4. A refrigerant flow control valve 15, capable of automatically opening and closing in response to the pressure differential between the separator 2 and the condenser 6, is disposed in the line 27 through which the refrigerant liquefied through heat exchange within the low-temperature regenerator 4 is introduced into the condenser 6.

Figure 2:
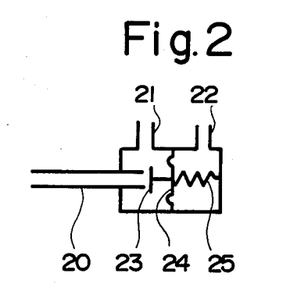
FIG. 2 is a schematic illustration of a valve for controlling the flow rate of a refrigerant and a solution which has absorbed the refrigerant.

The construction of the intermediate thickness solution flow control valve 14 and the refrigerant flow control valve 15 have substantially the same construction which is schematically illustrated in FIG. 2. The valve has an outlet pipe 20 and an inlet pipe 21. In case of the intermediate thickness solution flow control valve 14, the outlet pipe 20 is connected to the low-temperature regenerator 4, whereas, in case of the refrigerant flow control valve 15, the outlet pipe 20 is connected to the condenser 6. On the other hand, the inlet pipe 21 is connected to the intemediate thickness solution line 26 through which the intermediate thickness solution cooled through the high-temperature heat exchanger is delivered, in the case of the intermediate thickness solution flow control valve 14. In case of the refrigerant flow control valve 15, the inlet pipe 21 is connected to the liquid refrigerant line 27 through which the refrigerant liquefied in the low-temperature regenerator 4 is supplied. The valve has another connection 22 which is connected to the condenser 6 both in the cases of the intermediate thickness solution flow control valve 14 and the refrigerant flow control valve 15. The valve also has a diaphragm 24 which separates the space in the valve into a chamber communicating with the inlet pipe 21 and a chamber communicating with the connection 22. Therefore, a pressure differential is developed across the diaphragm 24 between the pressure derived from the inlet pipe 21 and the pressure in the condenser 6 transmitted through the connection 22, so that the diaphragm 24 is deflected in accordance with the pressure differential thereby moving a valve member 23 into and out of contact with a valve seat formed on the end of the outlet pipe 20. The diaphragm 24 is backed up by an adjustable spring 25 which has a function for adjusting the valve closing pressure in order to ensure perfect closing of the valve.

The apparatus shown in FIG. 1 employs a single heat source 10 for heating the high-temperature regenerator 1. In general, a burner for burning a fuel is used as the heat source 10. A reference numeral 16 designates a cooling air blower for discharge the condensation heat in the condenser 6 and the absorbed heat in the absorber 8 into the atmosphere during operation of the apparatus in the cooling mode. The apparatus further has a solution check valve which prevents the solution from flowing back to the absorber 8 from the low-temperature heat exchanger 5 when the solution pump 9 is stopped, and a solution bypass pipe 19 through which the solution flows during operation in the heating mode.

Thus, in each of the intermediate thickness solution flow control valve 14 and the refrigerant flow control valve 15, the communication between the inlet pipe 21 and the outlet 20 is selectively interrupted by the valve member 23 which moves in response to the pressure differential between the condenser 6 and the inlet 21. For operating the apparatus in the heating mode, the three-way valve 12 is switched to cause the water to flow as indicated by the arrow A in FIG. 1, so that the water is introduced into the water heater 11. The temperature of the water at the outlet of the water heater 11 is adjusted to range between 50° and 60° C. In this state, the pressure in the separator 2 ranges between 100 and 160 mm Hg Abs. In this case, therefore, the intermediate thickness solution flow control valve 14 and the refrigerant flow control valve 15 are adjusted such that they open when the pressure at the inlet pipe 21 is increased to 200 to 250 mm Hg Abs, so that the solution and the refrigerant vapor heated in the high-temperature regenerator 1 are prevented from flowing into the low-temperature regenerator 4 and the condenser 6. In consequence, the efficiency of the whole apparatus in the heating mode is improved significantly.

On the other hand, the operation in the cooling mode is initiated by switching the three-way valve 12 so as to cause the water to flow in the direction indicated by the arrow B. In this case, therefore, the water is chilled in the heat exchanger of the evaporator 7, as in the case of the known absorption type water cooling/heating apparatus. Assuming that the temperature in the separator 2 is 20° to 30° C., the pressure in the separator 2 usually ranges between 500 and 1500 mmHg Abs, so that the intermediate thickness solution flow control valve 14 and the refrigerant flow control valve 14 are kept open.

Needless to say, the differential-pressure responsive type valve used as the intermediate thickness solution flow control valve 14 and the refrigerant flow control valve 15 may be substituted by other types of valve which are operative in response to cooling/heating control signals, e.g., a solenoid valve or a modutrol valve. It will also be understood that the three-way valve 12 for conducting the change-over between the cooling and heating modes can be substituted by other types of valve such as a combination of two-way valves or a manual valve.

Figure 3:
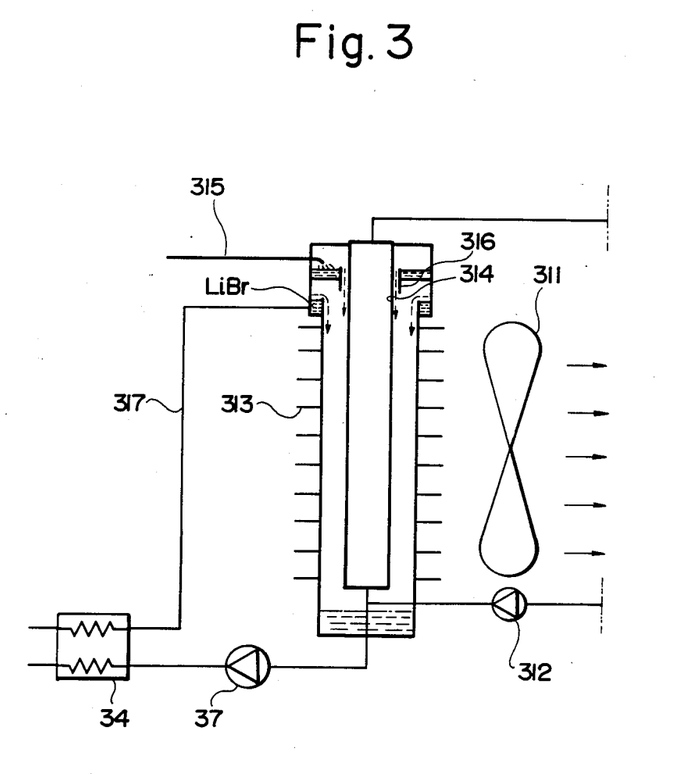
FIG. 3 is an illustration of an air-cooled absorber and an evaporator incorporated in the apparatus of the invention.

FIG. 3 shows an air-cooled fin-type absorber 313 suitable for use in the apparatus of the invention. This absorber is of "vertical flow liquid-film type air-cooled absorber" having a tubular body which is provided on the outer peripheral surface thereof with fins 313 for improving the efficiency of heat exchange upon contact with the cooling air. The thick solution, which has been cooled through heat exchange with the thin solution in the heat exchanger 34, is made to flow down along the inner wall surface of the tubular body.

More specifically, the air-cooled fin-type absorber 313 is provided at an upper portion thereof with a dam. The thick solution, which has been separated in the separator 2, is supplied through the line 317 via the heat exchanger 34 into the space defined by the dam, and the overflow of the thick solution over the dam is made to flow along the inner wall surface of the tubular member, in the form of a thin liquid film. In consequence, the thick solution is cooled as a result of heat exchange across the wall of the tubular member of the absorber with the cooling air which is induced by the blower 311.

The absorber 313 receives an evaporator pipe 314 with an outer surface which is suitably roughened or provided with convexities and concavities so as to produce a greater surface area, thus promoting the evaporation of the liquid refrigerant. The water as the heat transfer medium is circulated through this pipe 314. The refrigerant condensed in the condenser is introduced into the absorber 313 through a line 315. Another dam 316 provided to face an upper end portion of the evaporator tube 314 causes the liquid refrigerant to flow along the outer surface of the eaporator tube 314, thus offering a high efficiency of heat exchange between the liquid refrigerant and the water across the wall of the evaporator tube 314. Thus, the invention of this application can employ a vertical flow liquid-film type air-cooled absorber in which the absorber and the evaporator in the conventional apparatus are combined to realize a compact construction.

Figure 4:
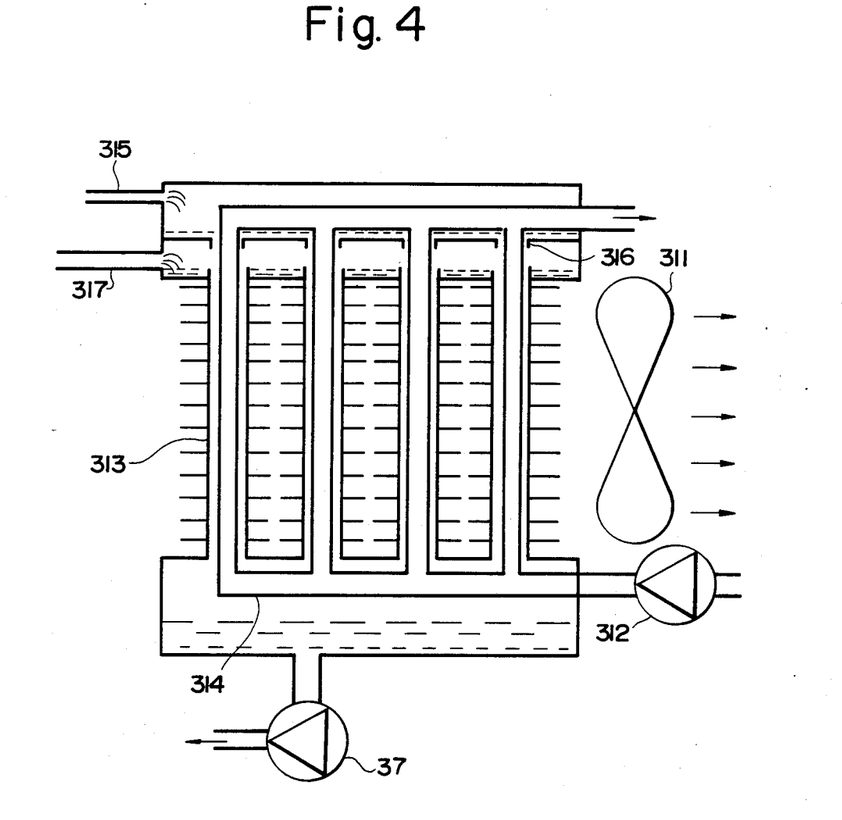
FIG. 4 is an illustration of a modification in which the air-cooled absorber and the evaporator shown in FIG. 4 are constructe from multiple parallel units.

For the purpose of attaining the cooling or refrigerating power, the invention can employ a plurality of the vertical flow liquid-film type air-cooled absorber arranged in parallel with each other. These absorbers are equipped with common dams so that the liquid refrigerant and the solution supplied through the lines 315 and 317 are made to flow down along respective surfaces of the parallel vertical flow liquid-film type air-cooled absorbers, thus attaining greater refrigeration power. With this arrangement, it is possible to simplify the construction of the apparatus as a whole, and any desired refrigeration capacity can be obtained by suitably selecting the number of the vertical flow liquid-fielm type air-cooled absorbers which are connected in parallel.

The operation of the air-cooled absorber is as follows. The thick solution which flows down from the upper end of the absorber 313 absorbs the refrigerant which has been evaporated on the surface of the evaporator pipe 314 and is gradually heated due to generation of the absorption heat, so that the absorption power tends to be decreased. However, since the absorber 313 is constructed such as to permit a direct heat exchange with the air, the solution which has absorbed the refrigerant is effectively cooled even though the heat exchange area is small, thus recovering or maintaining the absorption power. Meanwhile the liquid refrigerant flowing down along the outer surface of the evaporator pipe 314 is evaporated as a result of the heat exchange with the water which flows in the evaporator pipe, so that the specific volume of the refrigerant is gradually increased. This, however, does not hamper the evaporation because the passage between the evaporator and the absorber is large, thanks to the construction in which the whole surface of the evaporator pipe is surrounded by the absorber.

Thus, in the vertical flow liquid-film type air-cooled absorber enables direct cooling by the air, so that the temperature difference between the cooling air and the solution which has absorbed the refrigerant is maintained sufficiently small, thus assuring a high absorption efficiency. In addition, a high evaporation efficiency is attained because the refrigerant vapor generated on the evaporator pipe can reach the absorber without being encountered by substantial flow resistance, thanks to the construction in which the evaporator and the absorber are integrated such that they are positioned adjacent to each other.

Furthermore, the vertical flow liquid-film type air-cooled absorber can have reduced heat exchanging surface areas, contributing to a reduction in the size of the air-cooled absorption type water cooling/heating apparatus, as well as to the reduction in the production cost.

What is claimed is:

1. An air-cooled absorption type water cooling/heating apparatus comprising:
   I. a cooling circulation system including:
   (a) a high-temperature regenerator in which a thin solution which has absorbed a refrigerant is heated so that refrigerant vapor and thick solution are regenerated;
   (b) a separator for separating said refrigerant vapor and said thick solution from each other;
   (c) an air-cooled condenser for condensing said refrigerant vapor into liquid phase by air-cooling;
   (d) an evaporator in which the condensed liquid refrigerant is evaporated by heat derived from a heat exchanger leading to a heat radiator, thereby cooling a heat transfer medium circulated through said heat exchanger;
   (e) an absorber in which the refrigerant vapor generated in said evaporator in said thick solution introduced from said separator, said absorber being air-cooled so that the heat produced as a result of the absorption is carried away by the cooling air; and
   (f) a pump for supplying the thin solution which is formed from said thin solution as a result of absorption of said refrigerant vapor into said high-temperature regenerator;
   II. a heating circulation system including:
   (g) a heat exchanger provided in said separator and leading to said heat radiator; and
   III. means for closing a line between said separator and said condenser and a line between said separator and said absorber during operation of said apparatus in the heating mode.

2. An air-cooled absorption type water cooling/heating apparatus according to claim 1, wherein said condenser and said absorber are cooled by a common cooling air blower.

3. An air-cooled absorption type water cooling/heating apparatus according to claim 1, wherein the line between said separator and said condenser and the line between said separator and said absorber are selectively closed by pressure-differential responsive valves which are operative in response to the pressure in said condenser.

4. An air-cooled absorption type water cooling/heating apparatus according to claim 1, wherein the line between said separator and said condenser and the line between said separator and said absorber are selectively closed by solenoid valves.

5. An air-cooled absorption type water cooling/heating apparatus according to claim 1, wherein the line between said separator and said condenser and the line between said separator and said absorber are selectively closed by modutrol valves.

6. An air-cooled absorption type water cooling/heating apparatus according to claim 1, wherein said absorber has a tubular body with an outer surface provided with a multiplicity of cooling fins and an inner surface along which an absorbing solution flows down, and said evaporator includes an evaporator pipe disposed in said tubular body coaxially therewith and having an outer surface along which the liquid refrigerant flows down and having an internal space through which water as a cooling medium flows.

7. An air-cooled absorption type water cooling/heating apparatus according to claim 1, wherein said absorber has tubular bodies each having an outer surface provided with a multiplicity of cooling fins and an inner surface along which an absorbing solution flows down, and said evaporator includes evaporator pipes each being disposed in said tubular body coaxially therewith and having an outer surface along which the liquid refrigerant flows down and having an internal space through which water as a cooling medium flows.

8. An air-cooled absorption type water cooling/heating apparatus according to claim 1, wherein said heat radiator is selectively connected to said heat exchanger for cooling and said heat exchanger for heating, so as to be used selectively as a heat radiator for cooling purpose and a heat radiator for heating purpose.

9. An air-cooled absorption type water cooling/heating apparatus comprising:
   I. a cooling circulation system including:
   (a) a high-temperature regenerator in which a thin solution which has absorbed a refrigerant is heated;
   (b) a separator for separating refrigerant vapor and intermediate thickness solution obtained in said high-temperature regenerator from each other;
   (c) a low-temperature regenerator for heating, by the refrigerant vapor, said intermediate thickness solution separated in said separator and then cooled, thereby regenerating refrigerant vapor and thick solution;
   (d) an air-cooled condenser for condensing said refrigerant vapor from said low-temperature regenerator and said separator into liquid phase by air-cooling;
   (e) an evaporator in which the condensed liquid refrigerant is evaporated by heat derived from a heat exchanger leading to a cooling heat radiator, thereby cooling a heat transfer medium circulated through said heat exchanger;
   (f) an absorber in which the refrigerant vapor generated in said evaporator is absorbed in said thick solution introduced from said low-temperature regenerator, said absorber being air-cooled so that the heat produced as a result of the absorption is carried away by the cooling air; and
   (f) a pump for supplying the thin solution which is formed from said thin solution as a result of absorption of said refrigerant vapor into said high-temperature regenerator;
   II. a heating circulation system including:
   (f) a heat exchanger provided in said separator and leading to a heating heat radiator; and
   III. means for closing a line between said separator and said condenser and a line between said separator and said absorber during operation of the apparatus in the heating mode.

10. An air-cooled absorption type water cooling/heating apparatus according to claim 9, wherein said condenser and said absorber are cooled by a common cooling air blower.

11. An air-cooled absorption type water cooling/heating apparatus according to claim 9, wherein the line between said separator and said condenser and the line between said separator and said absorber are selectively closed by pressure-differential responsive valves which are operative in response to the pressure in said condenser.

12. An air-cooled absorption type water cooling-/heating apparatus according to claim 9, wherein the line between said separator and said condenser and the line between said separator and said absorber are selectively closed by solenoid valves.

13. An air-cooled absorption type water cooling-/heating apparatus according to claim 9, wherein the line between said separator and said condenser and the line between said separator and said absorber are selectively closed by modutrol valves.

14. An air-cooled absorption type water cooling-/heating apparatus according to claim 9, wherein said absorber has a tubular body with an outer surface provided with a multiplicity of cooling fins and an inner surface along which an absorbing solution flows down, and said evaporator includes an evaporator pipe disposed in said tubular body coaxially therewith and having an outer surface along which the liquid refrigerant flows down and having an internal space through which water as a cooling medium flows.

15. An air-cooled absorption type water cooling-/heating apparatus according to claim 9, wherein said absorber has tubular bodies each having an outer surface provided with a multiplicity of cooling fins and an inner surface along which an absorbing solution flows down, and said evaporator includes evaporator pipes each being disposed in said tubular body coaxially therewith and having an outer surface along which the liquid refrigerant flows down and having an internal space through which water as a cooling medium flows.

16. An air-cooled absorption type water cooling-/heating apparatus according to claim 1, wherein said heat radiator is selectively connected to said heat exchanger for cooling and said hat exchanger for heating, so as to be used selectively as a heat radiator for cooling purpose and a heat radiator for heating purpose.

* * * * *